US012617694B2

(12) United States Patent
Hirano et al.

(10) Patent No.: US 12,617,694 B2
(45) Date of Patent: May 5, 2026

(54) LOW ALPHA-RAY EMISSION STANNOUS OXIDE AND METHOD OF PRODUCING THE SAME

(71) Applicant: MITSUBISHI MATERIALS CORPORATION, Tokyo (JP)

(72) Inventors: Hirotaka Hirano, Sanda (JP); Yoshihiro Yoshida, Sanda (JP); Takuma Katase, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 18/653,084

(22) Filed: May 2, 2024

(65) Prior Publication Data

US 2024/0294391 A1 Sep. 5, 2024

Related U.S. Application Data

(62) Division of application No. 17/263,192, filed as application No. PCT/JP2019/027463 on Jul. 11, 2019, now abandoned.

(30) Foreign Application Priority Data

| | | |
|---|---|---|
| Jul. 30, 2018 | (JP) | 2018-142078 |
| Jul. 4, 2019 | (JP) | 2019-125029 |

(51) Int. Cl.
*C25D 3/30* (2006.01)
*B01J 19/00* (2006.01)
(Continued)

(52) U.S. Cl.
CPC .......... *C01G 19/02* (2013.01); *B01J 19/0066* (2013.01); *B01J 19/0086* (2013.01);
(Continued)

(58) Field of Classification Search
None
See application file for complete search history.

(56) References Cited

U.S. PATENT DOCUMENTS 2,104,076 A * 1/1938 Frick ...................... C22B 13/04
423/434
2013/0028786 A1 1/2013 Kanou
(Continued)

FOREIGN PATENT DOCUMENTS

| CN | 103030172 A | 4/2013 |
|---|---|---|
| CN | 103415633 A | 11/2013 |

(Continued)

OTHER PUBLICATIONS

Balaji Narasimham et al., "Influence of Polonium Diffusion at Elevated Temperature on the Alpha Emission Rate and Memory SER Performance," IEEE, 2017, pp. 3D-4.1-3D-4.8. (discussed in the spec).

(Continued)

*Primary Examiner* — Sheng H Davis
(74) *Attorney, Agent, or Firm* — Troutman Pepper Locke LLP; James E. Armstrong, IV

(57) ABSTRACT

What is provided is stannous oxide having an α-ray emission amount of 0.002 cph/cm$^2$ or less after heating in an atmosphere at 100° C. for 6 hours. Tin containing lead as an impurity is dissolved in a sulfuric acid aqueous solution to prepare a tin sulfate aqueous solution, and lead sulfate is precipitated in the aqueous solution and removed. While stirring the tin sulfate aqueous solution from which lead sulfate has been removed, a lead nitrate aqueous solution containing lead having an α-ray emission amount of 10 cph/cm$^2$ or less is added to cause lead sulfate to be precipitated in the tin sulfate aqueous solution, and simultaneously the tin sulfate aqueous solution is circulated while removing (Continued)

the lead sulfate from the aqueous solution. A neutralizing agent is added to the tin sulfate aqueous solution to collect stannous oxide.

4 Claims, 3 Drawing Sheets

(51) Int. Cl.
*C01G 19/02* (2006.01)
*C25D 21/14* (2006.01)

(52) U.S. Cl.
CPC . *B01J 2219/00189* (2013.01); *C01P 2006/44* (2013.01); *C25D 21/14* (2013.01)

(56) References Cited

U.S. PATENT DOCUMENTS

| | | | |
|---|---|---|---|
| 2014/0199203 A1 | 7/2014 | Takahata et al. |
| 2016/0160368 A1 | 6/2016 | Hosokawa |
| 2019/0153607 A1 | 5/2019 | Imori et al. |

FOREIGN PATENT DOCUMENTS

| | | | |
|---|---|---|---|
| CN | 103429535 A | 12/2013 |
| CN | 105813980 A | 7/2016 |
| EP | 2586746 A1 | 5/2013 |
| EP | 2637230 A1 | 9/2013 |
| JP | H03-223112 A | 10/1991 |
| JP | H1180852 A | 3/1999 |
| JP | H11-310415 A | 11/1999 |
| JP | 2007-302496 A | 11/2007 |
| JP | 4975367 B2 | 7/2012 |
| JP | 2012-218955 A | 11/2012 |
| JP | 2013-185214 A | 9/2013 |
| JP | 2016-074969 A | 5/2016 |
| TW | 201525152 A | 7/2015 |
| WO | 2007/004394 A1 | 1/2007 |
| WO | 2012/103396 A2 | 8/2012 |
| WO | 2015/098191 A1 | 7/2015 |

OTHER PUBLICATIONS

Nagakura, Saburo et al., "Iwanami Dictionary of Physics and Chemistry," 5th, edition, ISBN4-00-080090-6, Tokyo: Iwanami Shoten, Publishers, 2004, p. 1287. (cited in the ISR).

International Search Report mailed Sep. 17, 2019, issued for PCT/JP2019/027463 and English translation thereof.

Supplementary European Search Report mailed Apr. 8, 2022, issued for European Patent Application No. 19843269.2.

Office Action mailed Jun. 30, 2022, issued for Chinese Patent Application No. 201980035888.3 and English translation of the Search Report.

Office Action mailed Feb. 9, 2023, issued for TW108125386 and English translation thereof.

Office Action mailed Feb. 14, 2023, issued for JP2019-125029 and English machine translation thereof.

Notice of Allowance issued in Korean Patent Application No. KR 10-2020-7033058, mailed Dec. 4, 2023.

Clark, Brett, "The Distribution and Transport of Alpha Activity in Tin", Journal of Microelectronis and Electronic Packaging 10, 73-79, (2013).

* cited by examiner

FIG. 3

LOW ALPHA-RAY EMISSION STANNOUS OXIDE AND METHOD OF PRODUCING THE SAME

CROSS REFERENCE TO RELATED APPLICATIONS

This Application is a Divisional of U.S. patent application Ser. No. 17/263,192, filed Jan. 26, 2021, which Application is a U.S. National Phase Application filed under 35 U.S.C. § 371, based on International Patent Application No. PCT/JP2019/027463, filed Jul. 11, 2019, which application claims priority to Japanese Patent Application No. JP 2019-125029, filed Jul. 4, 2019, and Japanese Patent Application No. JP 2018-142078, filed Jul. 30, 2018. The entire contents of these applications are incorporated herein by reference in their entirety.

TECHNICAL FIELD

The present invention relates to stannous oxide having a low α-ray emission amount, which is suitably used as a material for replenishing tin or a tin alloy plating liquid with a Sn component and has a very small α-ray emission amount, and a method of producing the same.

Priority is claimed on Japanese Patent Application No. 2018-142078, filed Jul. 30, 2018, and Japanese Patent Application No. 2019-125029, filed Jul. 4, 2019, the contents of which are incorporated herein by reference.

BACKGROUND ART

Tin or a tin alloy plating liquid is used, for example, to form a solder bump on a wafer or a circuit board on which a semiconductor integrated circuit chip is mounted, and an electronic component such as the chip is bonded to the wafer or the board by the solder bump.

Hitherto, since it is known that lead (Pb) has an effect on the environment, as a solder material for producing such an electronic component, a solder material containing Pb-free tin (Sn) as a primary metal, for example, a solder represented by a Sn—Ag-based alloy such as Sn—Ag and Sn—Ag—Cu is used. However, even with a Pb-free solder material, it is very difficult to completely remove Pb from Sn, which is the primary solder material, and Sn contains a trace amount of Pb as an impurity. In recent years, in semiconductor devices with higher densities and higher capacities, α-rays emitted from $^{210}$Po generated from $^{210}$Pb, which is an isotope of Pb, cause a soft error. Therefore, there is a demand for tin having a low α-ray emission amount that emits α-rays caused by $^{210}$Pb contained as the impurity, as less as possible. Moreover, in the current market, products having an α-ray emission amount of 0.002 cph/cm$^2$ or less are most prevalent, and as an index, it is important that the α-ray emission amount is 0.002 cph/cm$^2$ or less. In addition, with the diversification of the environment in which products are used, there is an increasing demand for 0.001 cph/cm$^2$ or less.

In a case where the above-mentioned Sn—Ag-based alloy is subjected to electroplating, when Sn is used as the anode, Ag is substituted and precipitated on the anode surface because Ag is nobler than Sn. In order to avoid this, electroplating is performed using an insoluble anode such as Pt in many cases. However, in order to maintain the concentration of the plating liquid in a constant level, it is necessary to replenish the plating liquid with a Sn component.

In general, in a case of replenishing the plating liquid with the Sn component, since monovalent stannous oxide (SnO) is faster in dissolution rate in the plating liquid than metal tin (Sn) or divalent stannic oxide (SnO$_2$) and enables easy production of the replenisher, stannous oxide is suitably used as the material for replenishment with the Sn component. In addition, even regarding stannous oxide for replenishment with such a Sn component, stannous oxide having a reduced α-ray emission amount is required together with tin.

In the related art, stannous oxide having a reduced α-ray emission amount and a method of producing the same are disclosed (for example, refer to Patent Document 1 (claims 1 and 3) and Patent Document 2 (claim 1)). Patent Document 1 describes high-purity stannous oxide characterized by an α-ray count of 0.001 cph/cm$^2$ or less and a purity of 99.999% or more excluding stannic oxide (SnO$_2$), and a method of producing high-purity stannous oxide characterized in that electrolysis is performed using Sn which is a raw material as an anode and an electrolytic solution to which a component that forms a complex with monovalent Sn is added as an electrolytic solution, followed by neutralization to produce stannous oxide.

Patent Document 2 describes a method of producing a stannous oxide powder for replenishing a Sn alloy plating liquid with a Sn component, which is characterized by including a step of preparing an acidic aqueous solution by dissolving metal Sn having an α-ray emission amount of 0.05 cph/cm$^2$ or less in an acid, a step of preparing stannous hydroxide by neutralizing the acidic aqueous solution, and a step of producing stannous oxide by dehydrating the stannous hydroxide, in which, in the step of preparing the acidic aqueous solution, a Sn lump having an α-ray emission amount of 0.05 cph/cm$^2$ or less is immersed in the acidic aqueous solution after the dissolution.

On the other hand, in recent years, a problem has been reported that in a case where a chip bonded to a board by a solder is exposed to a high temperature environment during use, a soft error rate is higher than in the initial stage of use (for example, refer to Non Patent Document 1 (Abstract)). According to this report, the increase in the soft error rate is attributed to an increase in the α-ray emission amount from the solder material in a high temperature environment.

CITATION LIST

Patent Literature

[Patent Document 1]
  Japanese Patent No. 4975367
[Patent Document 2]
  Japanese Unexamined Patent Application, First Publication No. 2012-218955

Non-Patent Document

[Non-Patent Document 1]
  B. Narasimham et al. "Influence of Polonium Diffusion at Elevated Temperature on the Alpha Emission Rate and Memory SER", IEEE, pp 3D-4.1 to 3D-4.8, 2017.

SUMMARY OF INVENTION

Technical Problem

From the report of Non-Patent Document 1 described above, it becomes clear that an increase in the α-ray emission amount derived from a solder material leads to an increase in soft errors when a device is exposed to a high temperature environment, and not only the α-ray emission amount at the initial stage of tin production, but also the α-ray emission amount of tin when exposed to a high temperature environment is required to be the same as the initial α-ray emission amount. Specifically, it is necessary that the α-ray emission amount is 0.002 cph/cm$^2$ or less. This necessity applies not only to tin, but also to stannous oxide having a reduced α-ray emission amount for replenishment with a Sn component. In practice, the present inventors confirmed that even if the initial α-ray emission amount of tin or stannous oxide for replenishment with a Sn component is 0.001 cph/cm$^2$ or less, a low α-ray emission amount required of tin is not obtained upon heating corresponding to a high temperature environment. However, in Patent Documents 1 and 2 described above, when the stannous oxide produced by the production method is used for replenishing the plating liquid with the Sn component, and an electronic component is soldered to a board or the like by a solder bump formed of the plating liquid, no discussion has been made on the α-ray emission amount of tin in a high temperature environment after the soldering. In other words, in a case where the stannous oxide obtained in Patent Documents 1 and 2 is used for replenishing the plating liquid with the Sn component, there is concern that the α-ray emission amount of tin when finally exposed to a high temperature environment may exceed 0.001 cph/cm$^2$ or even 0.002 cph/cm$^2$.

An object of the present invention is to provide stannous oxide having a low α-ray emission amount in which the α-ray emission amount is not increased even when heated and the α-ray emission amount is 0.002 cph/cm$^2$ or less, and a method of producing the same.

Solution to Problem

A first aspect of the present invention is stannous oxide having a low α-ray emission amount, in which an α-ray emission amount after heating in an atmosphere at 100° C. for 6 hours is 0.002 cph/cm$^2$ or less.

A second aspect of the present invention is an invention based on the first aspect, and is the stannous oxide having a low α-ray emission amount in which an α-ray emission amount of the stannous oxide after heating in the atmosphere at 200° C. for 6 hours is 0.002 cph/cm$^2$ or less.

A third aspect of the present invention is a method of producing stannous oxide having a low α-ray emission amount, the method including: a step (a) of dissolving tin (Sn) containing lead (Pb) as an impurity in a sulfuric acid (H$_2$SO$_4$) aqueous solution to prepare a tin sulfate (SnSO$_4$) aqueous solution and cause lead sulfate (PbSO$_4$) to be precipitated in the tin sulfate aqueous solution; a step (b) of filtering the tin sulfate aqueous solution in the step (a) to remove the lead sulfate from the tin sulfate aqueous solution; a step (c) of adding a lead nitrate (PbNO$_3$) aqueous solution containing lead having an α-ray emission amount of 10 cph/cm$^2$ or less at a predetermined concentration to a first tank at a predetermined rate for over 30 minutes while stirring the tin sulfate aqueous solution from which the lead sulfate has been removed in the step (b) at a rotation speed of at least 100 rpm to cause lead sulfate to be precipitated in the tin sulfate aqueous solution, simultaneously circulating the tin sulfate aqueous solution so that a circulation flow rate is at least 1 vol %/min with respect to a total liquid amount in the first tank while filtering the tin sulfate aqueous solution to remove the lead sulfate from the tin sulfate aqueous solution; and a step (d) of adding a neutralizing agent to the tin sulfate aqueous solution obtained in the step (c) to collect stannous oxide (SnO).

A fourth aspect of the present invention is an invention based on the third aspect, and is the method of producing stannous oxide having a low α-ray emission amount, in which a concentration of lead nitrate in the lead nitrate aqueous solution in the step (c) is 10 mass % to 30 mass %.

A fifth aspect of the present invention is an invention based on the third or fourth aspect, and is the method of producing stannous oxide having a low α-ray emission amount, in which an addition rate of the lead nitrate aqueous solution in the step (c) is 1 mg/sec to 100 mg/sec with respect to 1 L of the tin sulfate aqueous solution.

Advantageous Effects of Invention

The stannous oxide having a low α-ray emission amount according to the first aspect of the present invention is characterized in that the α-ray emission amount does not increase at the initial stage of the production and even after a long period of time elapsed from the production, the α-ray emission amount does not increase even after heating in the air at 100° C. for 6 hours, and the α-ray emission amount remains at 0.002 cph/cm$^2$ or less.

The stannous oxide having a low α-ray emission amount according to the second aspect of the present invention is characterized in that the α-ray emission amount does not increase at the initial stage of the production and even after a long period of time elapsed from the production, the α-ray emission amount does not increase even after heating in the air at 200° C. for 6 hours, and the α-ray emission amount remains at 0.002 cph/cm$^2$ or less. Therefore, in a case where a plating film is formed using the stannous oxide having a low α-ray emission amount according to the first or second aspect as a Sn supply material for supplying Sn to tin or a tin alloy plating liquid, even when the plating film is exposed to a high temperature environment, the emission of α-rays from the plating film is extremely small, and a soft error is less likely to occur. The reason why the heating conditions are set to "at 100° C. for 6 hours" in the invention of the first aspect is that the actual use environment is expected to be about 100° C. and in terms of time, the same degree of increase in α-ray emission amount due to heating for a long period of time is confirmed by heating for 6 hours, so that measurement conditions can be clarified. In the invention of the second aspect, the reason for setting "at 200° C. for 6 hours" is that the higher the heating temperature, the easier the α-ray emission amount increases.

α-rays of a solder material are emitted from $^{210}$Po, but it is well known that when $^{210}$Pb which is a parent nuclide is present, the α-ray emission amount tends to increase with the half-life thereof. Therefore, confirming a change in the α-ray emission amount with the lapse of time is a very important factor. The increase in the α-ray emission amount can be calculated by a simulation, and reaches the maximum value in about 828 days. Therefore, in order to confirm whether or not there is a change in the α-ray emission amount with the lapse of time, it is preferable to confirm the change up to 828 days. On the other hand, the α-ray emission amount changes quadratically with the lapse of time, and the α-ray emission amount after 1 year changes at a rate of 80% or more of the maximum change. Therefore, in the present invention, it is confirmed that the α-ray emission amount does not change with the lapse of time by confirming that the α-ray emission amount does not change after 1 year.

In the method of producing stannous oxide having a low α-ray emission amount according to the third aspect of the present invention, a raw material tin containing lead as an impurity is converted into the tin sulfate aqueous solution, and the lead sulfate generated here is removed by filtering. Thereafter, the tin sulfate aqueous solution of the raw material tin is reacted with the lead nitrate aqueous solution containing lead (Pb having a low $^{210}Pb$ content) having a low α-ray emission amount to substitute ions of lead (Pb having a high $^{210}Pb$ content) having a high α-ray emission amount with ions of the lead (Pb having a low $^{210}Pb$ content) having a low α-ray emission amount such that lead sulfate is precipitated and removed by filtering. In this method, the concentration of $^{210}Pb$ contained in the raw material tin is reduced by a liquid phase method. Therefore, in this method, the lead nitrate aqueous solution having a predetermined concentration is added at a predetermined addition rate for over 30 minutes, and the tin sulfate aqueous solution is filtered to remove the lead sulfate and is circulated in the tank. Accordingly, it is possible to reduce the amount of $^{210}Pb$ by a necessary ratio in accordance with the amount of lead impurities contained in the raw material tin and the final target α-ray emission amount. Therefore, in the finally obtained stannous oxide, even if the α-ray emission amount due to $^{210}Pb$ at the initial stage of production is equivalent to the α-ray emission amount of Patent Document 1, not only the α-ray emission amount after a long period of time elapsed from the production, but also the α-ray emission amount after heating is not changed from the initial value even when heated in the air at 100° C. or 200° C. for 6 hours. In addition, in this method, since the concentration of $^{210}Pb$ can be continuously reduced, even if a raw material tin having an even higher $^{210}Pb$ concentration is used in theory, it is possible to produce the stannous oxide having a low α-ray emission amount.

In the method of producing stannous oxide having a low α-ray emission amount according to the fourth aspect of the present invention, by setting the concentration of lead nitrate in the lead nitrate aqueous solution in the step (c) to 10 mass % to 30 mass %, lead ($^{210}Pb$) derived from the raw material tin can be more reliably precipitated and removed, so that the α-ray emission amount of the stannous oxide after the heating is further reduced.

In the method of producing stannous oxide having a low α-ray emission amount according to the fifth aspect of the present invention, by setting the addition rate of the lead nitrate aqueous solution in the step (c) to 1 mg/sec to 100 mg/sec with respect to 1 L of the tin sulfate aqueous solution, lead ($^{210}Pb$) derived from the raw material tin can be more reliably precipitated and removed, so that the α-ray emission amount of the stannous oxide after the heating is even further reduced.

BRIEF DESCRIPTION OF DRAWINGS

FIG. 3 is a diagram showing a part of an apparatus for producing the stannous oxide having a low α-ray emission amount according to the present embodiment.

DESCRIPTION OF EMBODIMENTS

Next, embodiments of the present invention will be described with reference to the drawings.

6

Figure 2:
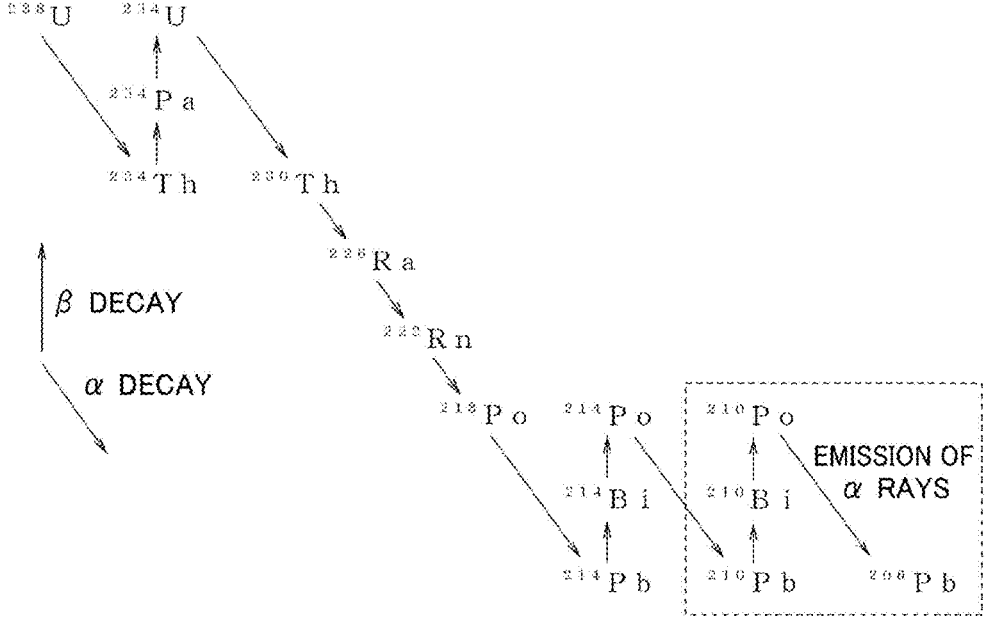
FIG. 2 is a diagram showing a decay chain (uranium-radium decay series) in which uranium (U) decays until $^{206}Pb$ is reached.

There are many radioactive elements that emit α-rays, but many do not actually pose a problem because their half-lives are either very long or very short. As indicated by the broken line frame in FIG. 2, α-rays, which actually pose a problem, are kinds of radiation emitted when a decay from $^{210}Po$, which is an isotope of Polonium after β decay occurs like $^{210}Pb \rightarrow ^{210}Bi \rightarrow ^{210}Po$ in the decay chain of U, into $^{206}Pb$, which is an isotope of lead, occurs. In particular, regarding the emission mechanism of α-rays of tin used for a solder, this has been clarified by past investigation. Here, Bi has a short half-life, and thus can be ignored in terms of management. In summary, an α-ray source of tin is primarily $^{210}Po$, and the amount of $^{210}Pb$, which is the emission source of $^{210}Po$, is attributed to the emission amount of α-rays.

First, a method of producing stannous oxide having a low α-ray emission amount according to an embodiment of the present invention will be described in order of steps shown in FIG. 1 and based on a production apparatus shown in FIG. 3.

<Step (a) and Step (b)>
[Metal Raw Material]

A metal raw material for obtaining the stannous oxide (SnO) having a low α-ray emission amount according to the embodiment of the present invention is tin, and selection of this raw material tin is not restricted by the Pb content of impurities or the magnitude of the α-ray emission amount. For example, even with a metal such as a commercially available tin in which the concentration of Pb is about 320 mass ppm and the α-ray emission amount of Pb is about 9 $cph/cm^2$, stannous oxide finally obtained by the production method and the production apparatus described below can achieve an α-ray emission amount of 0.002 $cph/cm^2$ or less after heating in the air at 100° C. or 200° C. for 6 hours. The shape of the raw material tin is not limited and may be powdery or lumpy. To accelerate the dissolution rate, there is also an electrolytic elution method using a hydrogen ion exchange membrane.

[Preparation of Tin Sulfate Aqueous Solution and Precipitation Separation of Lead Sulfate]

Figure 1:
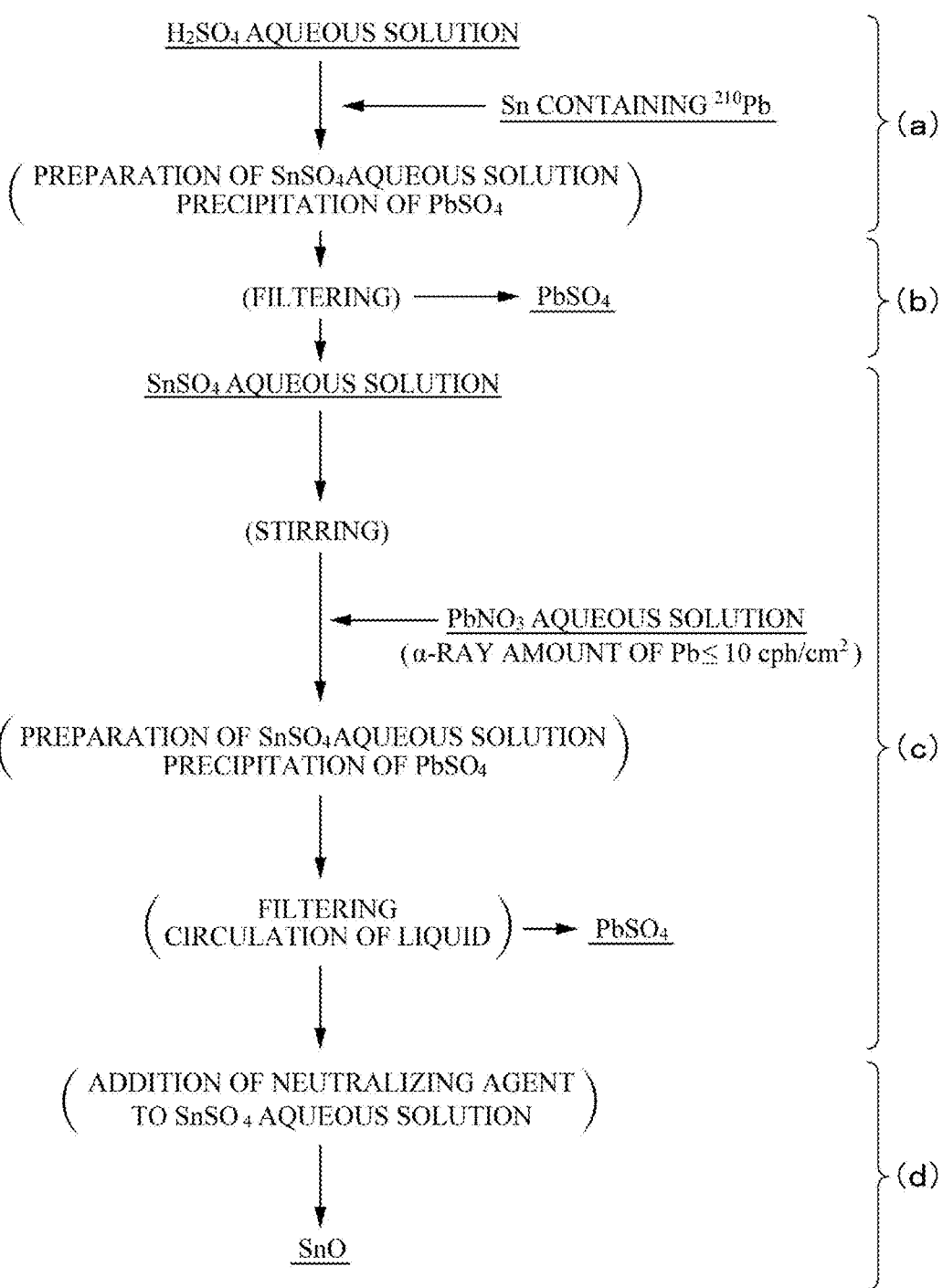
FIG. 1 is a flowchart showing each step of a method of producing stannous oxide having a low α-ray emission amount according to the present embodiment.
Figure 3:
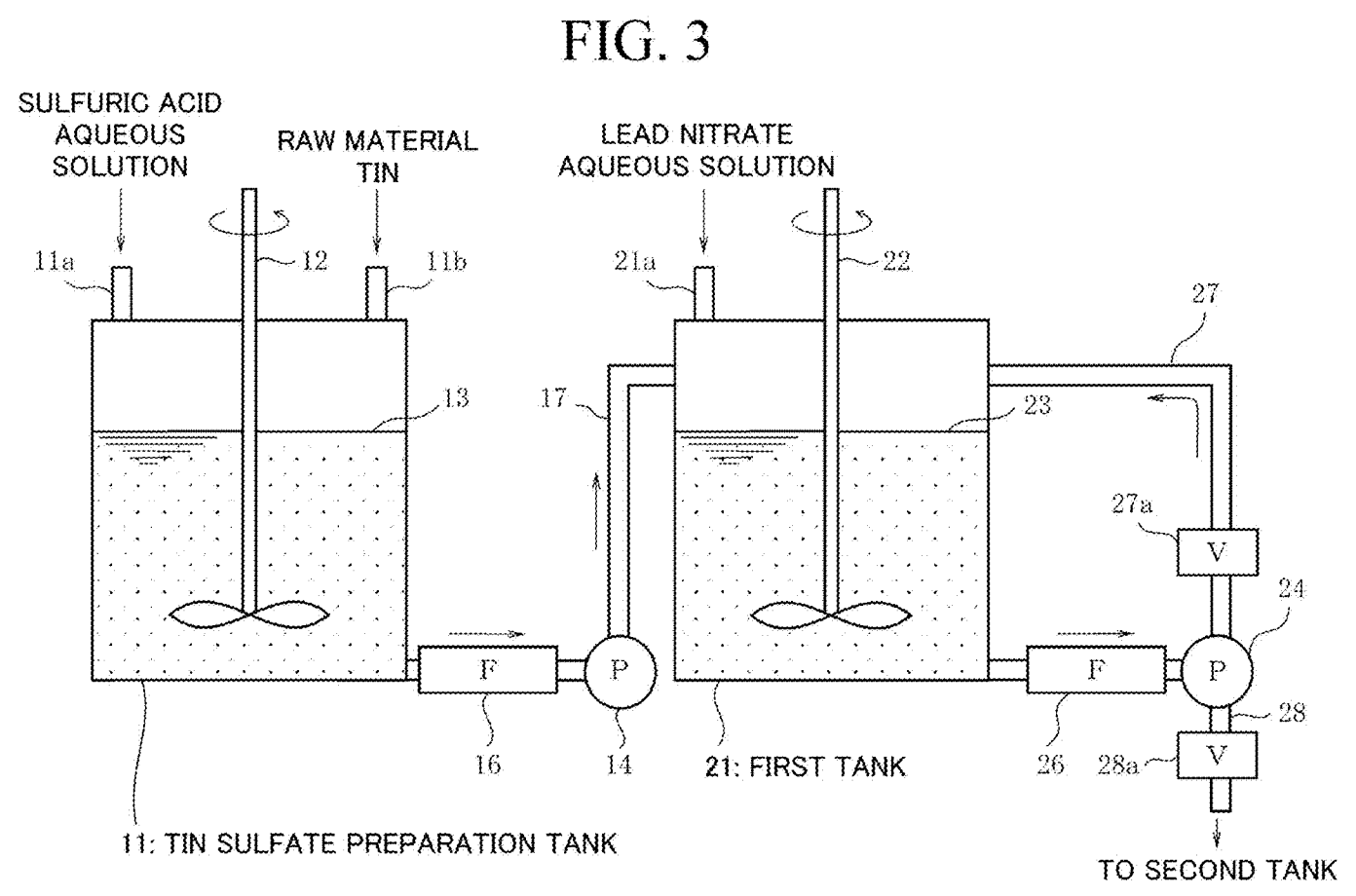

In step (a) and step (b) shown in FIG. 1, as shown in FIG. 3, a sulfuric acid aqueous solution ($H_2SO_4$) is put in a tin sulfate preparation tank 11 through a supply port 11a to be stored in the tank 11, and a raw material tin is added thereto through a supply port 11b and stirred by a stirrer 12 to dissolve the raw material tin in the sulfuric acid aqueous solution, whereby a tin sulfate ($SnSO_4$) aqueous solution 13 of the raw material tin is prepared. At this time, in the tin sulfate preparation tank 11, lead (Pb) in the raw material tin is precipitated as lead sulfate ($PbSO_4$). There are cases where lead sulfate ($PbSO_4$) is precipitated on the bottom portion of the tin sulfate preparation tank 11. By a pump 14 provided outside the tin sulfate preparation tank 11, the tin sulfate aqueous solution is passed (hereinafter, referred to as filtered) through a filter 16 and is also transferred to a subsequent first tank 21 via a transfer pipeline 17. The lead sulfate precipitated in the tin sulfate preparation tank 11 by the filter 16 is removed from the tin sulfate aqueous solution. A membrane filter is preferable as the filter 16. The pore size of the filter is preferably in a range of 0.1 µm to 10 µm, and more preferably in a range of 0.2 µm to 1 µm. Lead sulfate may contain impurities.

<Step (C)>
[Reduction of Lead ($^{210}Pb$)]

In step (c) shown in FIG. 1, the first tank 21 shown in FIG. 3 stores a tin sulfate aqueous solution 23 which is transferred by the pump 14 and from which the lead sulfate has been removed. When a predetermined amount of the tin sulfate aqueous solution 23 is stored in the first tank 21, a lead nitrate aqueous solution having a predetermined concentration and containing lead (Pb) having an α-ray emission amount as low as 10 cph/cm² or less is added to the first tank 21 through a supply port 21a, and the tin sulfate aqueous solution 23 is stirred by a stirrer 22 at a rotation speed (stirring speed) of at least 100 rpm. Here, the tin sulfate aqueous solution 23 of the raw material tin from which the lead sulfate has been removed is adjusted to a temperature of 10° C. to 50° C., and more preferably 20° C. to 40° C., and the lead nitrate aqueous solution containing lead having the low α-ray emission amount is added at a predetermined rate for over 30 minutes. As a result, lead sulfate (PbSO₄) is precipitated in the tin sulfate aqueous solution. There are cases where lead sulfate (PbSO₄) is precipitated on the bottom portion of the first tank 21. This lead nitrate aqueous solution is prepared, for example, by mixing Pb having a surface α-ray emission amount of 10 cph/cm² and a purity of 99.99% in a nitric acid aqueous solution. Accordingly, lead ($^{210}$Pb), which is a radioisotope in impurities and is contained in the raw material tin and cause a high α-ray emission amount and ions of lead (Pb) which is a stable isotope, are removed after being mixed in the liquid, and the amount of lead ($^{210}$Pb) which is the radioisotope in the liquid gradually decreases. The concentration of tin sulfate in the tin sulfate aqueous solution of the raw material tin is preferably 100 g/L or more and 250 g/L or less, and more preferably 150 g/L or more and 200 g/L or less. The concentration of sulfuric acid (H₂SO₄) in the tin sulfate aqueous solution is set to preferably 10 g/L or more and 50 g/L or less, and more preferably 20 g/L or more and 40 g/L or less.

When a stirring speed of the tin sulfate aqueous solution is less than 100 rpm, lead ions in the tin sulfate aqueous solution and the lead nitrate aqueous solution are precipitated as lead sulfate before being sufficiently mixed, so that ions of lead ($^{210}$Pb) which is the radioisotope in the tin sulfate aqueous solution cannot be substituted with ions of lead (Pb) which is the stable isotope. The upper limit of the stirring speed is a rotation speed at which the liquid is not scattered by stirring, and is determined by the size of the first tank 21 which is a reaction tank, and the size and shape of the blades of the stirrer 22. Here, regarding the size of the first tank 21, a cylindrical container having a diameter of about 1.5 m can be used, the size of the blade of the stirrer 22 is a radius of about 0.5 m (a diameter of about 1 m), and the shape thereof can be a propeller shape.

The α-ray emission amount of lead contained in the lead nitrate aqueous solution is an α-ray emission amount as low as 10 cph/cm² or less. The α-ray emission amount is set to 10 cph/cm² or less because the α-ray emission amount of the finally obtained stannous oxide cannot be set to 0.002 cph/cm² or less. The concentration of lead nitrate in the lead nitrate aqueous solution is preferably 10 mass % to 30 mass %. When the concentration thereof is less than 10 mass %, the reaction time between the tin sulfate aqueous solution and the lead nitrate aqueous solution is prolonged and the production efficiency tends to deteriorate, and when the concentration thereof exceeds 30 mass %, lead nitrate is not efficiently utilized and tends to be wasted.

An addition rate of the lead nitrate aqueous solution is preferably 1 mg/sec to 100 mg/sec, and more preferably 1 mg/sec to 10 mg/sec with respect to 1 L of the tin sulfate aqueous solution. This addition rate depends on the concentration of lead nitrate in the lead nitrate aqueous solution. When the addition rate is less than 1 mg/sec, the reaction time between the tin sulfate aqueous solution and the lead nitrate aqueous solution is prolonged and the production efficiency tends to deteriorate, and when the addition rate exceeds 100 mg/sec, lead nitrate is not efficiently utilized and tends to be wasted. Furthermore, it takes 30 minutes or longer to add the lead nitrate aqueous solution because even if the concentration and the addition rate of the lead nitrate aqueous solution are increased, the reduction in lead ($^{210}$Pb) as the radioisotope proceeds only at a constant rate, and it is necessary to add the lead nitrate aqueous solution for over a certain period of time for a sufficient reduction. Therefore, when the addition time is shorter than 30 minutes, the α-ray emission amount of the raw material tin cannot be reduced to a desired value.

Returning to FIG. 3, in step (c) shown in FIG. 1, simultaneously with the above addition, the tin sulfate aqueous solution 23 in the first tank 21 at a temperature of 10° C. to 50° C. is sent to a circulation pipeline 27 through a filter 26 by a pump 24 provided outside the first tank 21, or transferred to a subsequent second tank (not illustrated) via a transfer pipeline 28. The circulation pipeline 27 and the transfer pipeline 28 are respectively provided with on-off valves 27a and 28a. While removing the residual lead sulfate (PbSO₄) from the tin sulfate aqueous solution 23 by the filter 26 in the first tank 21 by operating the pump 24, the valve 27a is opened and the valve 28a is closed, whereby the tin sulfate aqueous solution 23 is circulated through the circulation pipeline 27 at a circulation flow rate of at least 1 vol %/min with respect to the total liquid amount in the first tank. That is, 1 vol % or more of the total liquid amount in the first tank is circulated per minute. For example, in a case where the total liquid amount in the first tank is 100 L, 1 L/min or more of the liquid is circulated. By the circulation of the tin sulfate aqueous solution, excess lead sulfate in the liquid is removed, and substitution between ions of lead ($^{210}$Pb) which is the radioisotope and ions of lead (Pb) which is the stable isotope in the tin sulfate aqueous solution is smoothly performed. The circulation flow rate is set to at least 1 vol %/min (1 vol %/min or more) because when the circulation flow rate is less than 1 vol %/min, the liquid amount of the tin sulfate aqueous solution passing through the filter 26 becomes small, the efficiency of collecting lead sulfate suspended in the liquid by the filter 26 decreases, a large amount of lead sulfate remains in the tin sulfate aqueous solution, and substitution between ions of lead ($^{210}$Pb) which is the radioisotope and ions of lead (Pb) which is the stable isotope in the tin sulfate aqueous solution is not smoothly performed. The circulation flow rate is adjusted by a flow meter (not illustrated) installed in the pump 24 and the circulation pipeline 27. The circulation flow rate is more preferably set to 5 vol %/min or more. The circulation flow rate is set to preferably 50 vol %/min or less, and more preferably 30 vol %/min or less. As the filter 26, the above-mentioned membrane filter can be used. In step (c), the tin sulfate aqueous solution 23 may be circulated in the first tank 21 with bubbling using an inert gas such as nitrogen gas. By circulating the tin sulfate aqueous solution 23 with bubbling, the generation of Sn⁴⁺ in the liquid can be suppressed. Accordingly, the proportion of Sn⁴⁺ contained in the stannous oxide obtained in step (d), which will be described below, can be reduced, so that when the plating liquid is replenished with the stannous oxide, the generation of sludge in the plating liquid and suspension of the plating liquid can be suppressed. The flow rate of the inert gas is preferably set to 5 L/min or more and 30 L/min or less.

<Step (d)>

[Collection of Stannous Oxide (SnO)]

Subsequently, in step (d) shown in FIG. 1, a neutralizing agent is added to the tin sulfate aqueous solution in which the amount of lead ($^{210}$Pb) is reduced, the resultant is subjected to solid-liquid separation such as filtering in an inert gas atmosphere, for example, a nitrogen gas atmosphere, and a stannous oxide precursor of the separated slurry is washed with pure water. After the washing with water, solid-liquid separation is performed again and washing with water is performed again. This is repeated 3 to 5 times. The stannous oxide subjected to the final solid-liquid separation is dried in a vacuum at a temperature of 20° C. or higher to obtain powdery stannous oxide (SnO). Examples of the neutralizing agent include sodium hydrogen carbonate, sodium hydroxide, potassium hydrogen carbonate, potassium hydroxide, ammonium hydrogen carbonate, and ammonia water. Solid-liquid separation and washing with water are performed in an inert gas atmosphere in order to prevent the stannous oxide precursor in the slurry from being oxidized to stannic oxide. In addition, drying of the stannous oxide in a vacuum is also to prevent the stannous oxide from being oxidized to stannic oxide.

The powdery stannous oxide obtained in the above embodiment is characterized in that the α-ray emission amount is 0.002 cph/cm$^2$ or less at the initial stage of the production and after a long period of time elapsed from the production, and the α-ray emission amount is 0.002 cph/cm$^2$ or less even after heating in the air at 100° C. or 200° C. for 6 hours.

EXAMPLES

Next, examples of the present invention will be described in detail together with comparative examples.

Example 1

A commercially available Sn powder having an α-ray emission amount of 10 cph/cm$^2$ and a Pb concentration of 15 ppm was used as a metal raw material, and this was added to a sulfuric acid aqueous solution at a concentration of 130 g/L stored in a tin sulfate preparation tank, mixed therein, and dissolved at 50° C., whereby 1 m$^3$ of a 200 g/L (as tin sulfate) tin sulfate aqueous solution was prepared. The concentration of sulfuric acid (H$_2$SO$_4$) of the tin sulfate aqueous solution was about 40 g/L.

Accordingly, Pb contained in the metal raw material tin was precipitated as lead sulfate. The tin sulfate aqueous solution was filtered through a membrane filter (pore size: 0.2 μm) manufactured by Yuasa Membrane Systems Co., Ltd. to remove lead sulfate. Next, in the first tank, the tin sulfate aqueous solution from which lead sulfate had been removed was adjusted to 40° C. and then stirred at a rotation speed of 100 rpm. In the meanwhile, to this aqueous solution, a lead nitrate aqueous solution (lead nitrate concentration: 20 mass %) containing Pb having an α-ray emission amount of 10 cph/cm$^2$ was added at a rate of 1 mg/sec·L (1000 mg/sec) for over 30 minutes. As the first tank, a cylindrical container having a diameter of 1.5 m with a propeller-shaped stirrer having a blade with a radius of about 0.5 m (a diameter of about 1 m) was used. Simultaneously with this addition, the tin sulfate aqueous solution was passed through the same membrane filter as above to remove lead sulfate from the tin sulfate aqueous solution, and with nitrogen bubbling performed at 10 L/min in the first tank, the tin sulfate aqueous solution was circulated so that the circulation flow rate was 1 vol %/min with respect to the total liquid amount in the first tank. Thereafter, sodium hydrogen carbonate was directly added to the tin sulfate aqueous solution after filtering the tin sulfate aqueous solution from the first tank as a neutralizing agent in a nitrogen gas atmosphere, and the obtained slurry was filtered. Solid contents obtained by the filtration in the nitrogen gas atmosphere were washed with pure water. After repeating filtration and washing with water three times, the solid contents were dried in a vacuum at a temperature of 20° C. or higher to obtain powdery stannous oxide.

The production conditions of Example 1 described above are shown in Table 1 below. The addition rate of the lead nitrate aqueous solution is the addition rate to 1 L of the tin sulfate aqueous solution. The total addition amount of the lead nitrate aqueous solution is the amount added to 1 L of the tin sulfate aqueous solution.

TABLE 1

| | Pb concentration | Tin sulfate aqueous solution | | Lead nitrate aqueous solution | | | | Total |
| | | | | α-ray emission | | | | |
| | in raw material Sn (mass ppm) | Stirring speed (rpm) | Circulation flow rate (vol %/min) | amount of Pb (cph/cm$^2$) | Lead nitrite concentration (mass %) | Addition rate (mg/sec · L) | Addition time (min) | amount added (mg/L) |
|---|---|---|---|---|---|---|---|---|
| Example 1 | 15 | 100 | 1 | 10 | 20 | 1 | 30 | 360 |
| Example 2 | 15 | 500 | 1 | 10 | 20 | 1 | 30 | 360 |
| Example 3 | 15 | 1000 | 1 | 10 | 20 | 1 | 30 | 360 |
| Example 4 | 15 | 500 | 1 | 10 | 10 | 1 | 30 | 180 |
| Example 5 | 15 | 500 | 1 | 10 | 20 | 1 | 30 | 360 |
| Example 6 | 15 | 500 | 1 | 10 | 30 | 1 | 30 | 540 |
| Example 7 | 15 | 500 | 1 | 10 | 40 | 1 | 30 | 720 |
| Example 8 | 15 | 500 | 1 | 10 | 20 | 1 | 30 | 360 |
| Example 9 | 15 | 500 | 1 | 10 | 20 | 10 | 30 | 3600 |
| Example 10 | 15 | 500 | 1 | 10 | 20 | 100 | 30 | 36000 |
| Example 11 | 150 | 500 | 1 | 10 | 20 | 1 | 30 | 360 |
| Example 12 | 240 | 500 | 1 | 10 | 20 | 1 | 30 | 360 |
| Example 13 | 320 | 500 | 1 | 10 | 20 | 1 | 30 | 360 |
| Example 14 | 15 | 500 | 1 | 10 | 5 | 1 | 60 | 180 |
| Example 15 | 15 | 500 | 1 | 10 | 1 | 1 | 300 | 180 |
| Example 16 | 15 | 500 | 1 | 10 | 20 | 0.5 | 60 | 360 |

TABLE 1-continued

|  | Pb concentration in raw material Sn (mass ppm) | Tin sulfate aqueous solution | | Lead nitrate aqueous solution | | | | |
|---|---|---|---|---|---|---|---|---|
|  |  | Stirring speed (rpm) | Circulation flow rate (vol %/min) | α-ray emission amount of Pb (cph/cm²) | Lead nitrite concentration (mass %) | Addition rate (mg/sec · L) | Addition time (min) | Total amount added (mg/L) |
| Comparative Example 1 | 15 | 50 | 1 | 10 | 20 | 1 | 30 | 360 |
| Comparative Example 2 | 15 | 500 | 0.5 | 10 | 20 | 1 | 30 | 360 |
| Comparative Example 3 | 15 | 500 | 1 | 10 | 40 | 1 | 20 | 480 |
| Comparative Example 4 | 15 | 500 | 1 | 10 | 20 | 1 | 20 | 240 |
| Comparative Example 5 | 15 | 500 | 1 | 10 | 20 | 10 | 20 | 2400 |
| Comparative Example 6 | 15 | 500 | 1 | 10 | 20 | 100 | 20 | 24000 |
| Comparative Example 7 | 15 | 500 | 1 | 12 | 20 | 1 | 30 | 360 |

Examples 2 to 16 and Comparative Examples 1 to 7

In Examples 2 to 16 and Comparative Examples 1 to 7, the raw material tin, the stirring speed and circulation flow rate of the tin sulfate aqueous solution, the α-ray emission amount of Pb in the lead nitrate aqueous solution, lead nitrate concentration, addition rate, addition time, and total addition amount described in Example 1 were changed as shown in Table 1 above. Hereinafter, in the same manner as in Example 1, stannous oxides as final products were obtained.

Comparative Example 8

In Comparative Example 8, stannous oxide was obtained by the method according to Example 2 of Patent Document 1 described in the background art of the present specification. Specifically, a raw material tin (Sn) in a level of 4N was used as the anode. As the electrolytic solution, an ammonium sulfate aqueous solution was used and adjusted to a pH of 6 to a pH of 7. Methanesulfonic acid was added as a complex ion forming agent to adjust the pH to 3.5. The resultant was subjected to electrolysis under the conditions of an electrolysis temperature of 20° C. and a current density of 1 A/dm². By the electrolysis, stannous oxide (SnO) was precipitated. The resultant was filtered and dried to be purified after the electrolysis, whereby powdery stannous oxide having an α-ray emission amount of 0.001 cph/cm² was finally obtained.

Comparative Example 9

In Comparative Example 9, stannous oxide was obtained by the method according to an example of Patent Document 2 described in the background art of the present specification. Specifically, first, an acidic aqueous solution was prepared by an electrolysis method under the following conditions.

Sn plate: 180×155×1 mm, about 200 g, α-ray emission amount: 0.002 cph/cm² or less, purity: 99.995% or more
Tank: Diaphragm electrolyzer Anode tank: 2.5 L of 3.5 N (3.5 mol/L) hydrochloric acid was used
Cathode tank: 2.5 L of 3.5 N (3.5 mol/L) hydrochloric acid was used
Electrolysis amount: Electrolyzed at a constant voltage of 2 V for 30 hours.
Target Sn composition after completion of electrolysis: Sn concentration 200 g/L
HCl concentration after completion of electrolysis: Normality 1 N (1 mol/L)

As a $Sn^{4+}$ reduction treatment, after electrolysis, a Sn plate (180 ×155 ×1 mm, about 200 g, α-ray emission amount: 0.002 cph/cm² or less, purity: 99.995% or more) was immersed in an acidic aqueous solution at 80° C. for 3 days and subjected to a reflux treatment (a treatment in which a liquid overflowing from an electrolyzer (anode tank or cathode tank) is returned to the electrolyzer with a pump), and a free acid (FA) reduction treatment of causing the concentration of hydrochloric acid to be 0.5 N (0.5 mol/L) or less was performed by repeating boiling the liquid until the amount of the liquid was halved and diluting the liquid after the boiling with pure water to return the amount of the liquid to the original amount.

Next, the acidic aqueous solution was neutralized under the following conditions to prepare stannous hydroxide.
  Atmosphere: $N_2$ gas
  Alkaline aqueous solution: 40 mass % ammonium carbonate aqueous solution
  Liquid temperature of acidic aqueous solution: 30° C. to 50° C.
  pH during neutralization: 6 to 8
Next, the stannous hydroxide was dehydrated under the following conditions.
  Atmosphere: $N_2$ gas
  Liquid temperature: 80° C. to 100° C.
  Time: 1 to 2 hours
In addition, filtration was performed by a suction filtration method, and washing with water was performed twice with warm water (70° C.) and once with pure water. Furthermore, drying in a vacuum was performed at 25° C. overnight to obtain powdery stannous oxide.
<Comparative Test and Evaluation>

Regarding the stannous oxides which were 25 kinds of final products obtained in Examples 1 to 16 and Comparative Examples 1 to 9, the Pb concentration in the stannous oxide and the α-ray emission amount by Pb before heating, after heating, and 1 year after slow cooling after heating were measured by the methods described below. The results are shown in Table 2 below.

(a) Pb Concentration in Stannous Oxide

Regarding the Pb concentration in the stannous oxide, the powdery stannous oxide was used as a sample, this was dissolved in hot hydrochloric acid, the obtained liquid was analyzed by ICP (plasma optical emission spectrometer, limit of quantification: 1 mass ppm), and the amount of impurity Pb was measured.

(b) $\alpha$-ray Emission Amount by Pb in Stannous Oxide

First, the obtained powdery stannous oxide was used as Sample 1 before heating. The $\alpha$-ray emission amount emitted from Sample 1 before heating was measured for 96 hours by a gas flow type $\alpha$-ray measuring device (MODEL-1950, limit of measurement: 0.0005 cph/cm$^2$) manufactured by Alpha Sciences Inc. The limit of measurement of this device is 0.0005 cph/cm$^2$. The $\alpha$-ray emission amount at this time was defined as the $\alpha$-ray emission amount before heating. Next, Sample 1 measured before heating was heated in the air at 100° C. for 6 hours and then gradually cooled to room temperature to obtain Sample 2. The $\alpha$-ray emission amount of Sample 2 was measured by the same method as Sample 1. The $\alpha$-ray emission amount at this time was defined as "after heating (100° C.)". Next, Sample 2 after the measurement of the $\alpha$-ray emission amount was heated in the air at 200° C. for 6 hours and then gradually cooled to room temperature to obtain Sample 3. The $\alpha$-ray emission amount of Sample 3 was measured by the same method as Sample 1. The $\alpha$-ray emission amount at this time was defined as "after heating (200° C.)". Furthermore, Sample 3 was vacuum-packed to prevent contamination and stored for 1 year to obtain Sample 4, and the $\alpha$-ray emission amount of Sample 4 was measured by the same method as Sample 1. The $\alpha$-ray emission amount at this time was defined as "after 1 year".

TABLE 2

| | | Final product | | | | |
|---|---|---|---|---|---|---|
| | | Pb concentration (mass ppm) | $\alpha$-ray emission (cph/cm$^2$) | | | |
| | Kind | | Before heating | After heating (100° C.) | After heating (200° C.) | After 1 year |
| Example 1 | SnO | 2 | <0.0005 | <0.0005 | <0.0005 | <0.0005 |
| Example 2 | SnO | 2 | <0.0005 | <0.0005 | <0.0005 | <0.0005 |
| Example 3 | SnO | 3 | <0.0005 | <0.0005 | <0.0005 | <0.0005 |
| Example 4 | SnO | 2 | <0.0005 | <0.0005 | <0.0005 | <0.0005 |
| Example 5 | SnO | 2 | <0.0005 | <0.0005 | <0.0005 | <0.0005 |
| Example 6 | SnO | 2 | <0.0005 | <0.0005 | <0.0005 | <0.0005 |
| Example 7 | SnO | 3 | <0.0005 | <0.0005 | <0.0005 | <0.0005 |
| Example 8 | SnO | 2 | <0.0005 | <0.0005 | <0.0005 | <0.0005 |
| Example 9 | SnO | 2 | <0.0005 | <0.0005 | <0.0005 | <0.0005 |
| Example 10 | SnO | 2 | <0.0005 | <0.0005 | <0.0005 | <0.0005 |
| Example 11 | SnO | 2 | <0.0005 | <0.0005 | <0.0005 | <0.0005 |
| Example 12 | SnO | 2 | <0.0005 | <0.0005 | <0.0005 | <0.0005 |
| Example 13 | SnO | 2 | <0.0005 | <0.0005 | <0.0005 | <0.0005 |
| Example 14 | SnO | 3 | <0.0005 | <0.0005 | <0.0005 | <0.0005 |
| Example 15 | SnO | 2 | <0.0005 | <0.0005 | <0.0005 | <0.0005 |
| Example 16 | SnO | 2 | <0.0005 | <0.0005 | <0.0005 | <0.0005 |
| Comparative Example 1 | SnO | 3 | 0.0007 | 0.0021 | 0.0025 | 0.0112 |
| Comparative Example 2 | SnO | 2 | <0.0005 | 0.0023 | 0.0027 | 0.0152 |
| Comparative Example 3 | SnO | 2 | <0.0005 | 0.0024 | 0.0023 | 0.0039 |
| Comparative Example 4 | SnO | 3 | <0.0005 | 0.0021 | 0.0027 | 0.0032 |

TABLE 2-continued

| | | Final product | | | | |
|---|---|---|---|---|---|---|
| | | Pb concentration (mass ppm) | $\alpha$-ray emission (cph/cm$^2$) | | | |
| | Kind | | Before heating | After heating (100° C.) | After heating (200° C.) | After 1 year |
| Comparative Example 5 | SnO | 2 | 0.0005 | 0.0022 | 0.0023 | 0.0035 |
| Comparative Example 6 | SnO | 2 | <0.0005 | 0.0025 | 0.0025 | 0.0031 |
| Comparative Example 7 | SnO | 3 | 0.0006 | 0.0023 | 0.0025 | 0.0056 |
| Comparative Example 8 | SnO | <1 | <0.0006 | 0.0022 | 0.0026 | 0.0052 |
| Comparative Example 9 | SnO | 3 | 0.0009 | 0.0027 | 0.0029 | 0.0082 |

As is clear from Table 2, in Comparative Example 1, since the stirring speed of the tin sulfate aqueous solution when the lead nitrate aqueous solution was added was set to 50 rpm, lead ($^{210}$Pb) as the radioisotope of the raw material tin was insufficiently reduced. In addition, although the $\alpha$-ray emission amount of the metal tin before heating was 0.0007 cph/cm$^2$, the $\alpha$-ray emission amount was increased to 0.0021 cph/cm$^2$ after heating at 100° C., to 0.0025 cph/cm$^2$ after heating at 200° C., and further to 0.0112 cph/cm$^2$ after 1 year.

In Comparative Example 2, since the circulation flow rate of the tin sulfate aqueous solution during the addition and after the addition of the lead nitrate aqueous solution was set to 0.5 vol %/min, lead ($^{210}$Pb) as the radioisotope in the raw material was insufficiently reduced. In addition, although the $\alpha$-ray emission amount of the metal tin before heating was less than 0.0005 cph/cm$^2$, the $\alpha$-ray emission amount was increased to 0.0023 cph/cm$^2$ after heating at 100° C., to 0.0027 cph/cm$^2$ after heating at 200° C., and further to 0.0152 cph/cm$^2$ after 1 year.

In Comparative Example 3, since the addition time was set to 20 minutes even though the lead nitrate concentration of the lead nitrate aqueous solution was as high as 40 mass %, lead ($^{210}$Pb) as the radioisotope of the raw material tin was insufficiently reduced. In addition, although the $\alpha$-ray emission amount of the metal tin before heating was less than 0.0005 cph/cm$^2$, the $\alpha$-ray emission amount was increased to 0.0024 cph/cm$^2$ after heating at 100° C., to 0.0023 cph/cm$^2$ after heating at 200° C., and further to 0.0039 cph/cm$^2$ after 1 year.

In Comparative Example 4, since the lead nitrate concentration of the lead nitrate aqueous solution was set to 20 mass % and the addition time was set to 20 minutes, lead ($^{210}$Pb) as the radioisotope of the raw material tin was insufficiently reduced. In addition, although the $\alpha$-ray emission amount of the metal tin before heating was less than 0.0005 cph/cm$^2$, the $\alpha$-ray emission amount was increased to 0.0021 cph/cm$^2$ after heating at 100° C., to 0.0027 cph/cm$^2$ after heating at 200° C., and further to 0.0032 cph/cm$^2$ after 1 year.

In Comparative Example 5, since the addition time was set to 20 minutes even though the addition rate of the lead nitrate aqueous solution was as fast as 10 mg/sec, lead ($^{210}$Pb) as the radioisotope of the raw material tin was insufficiently reduced. In addition, although the $\alpha$-ray emission amount of the metal tin before heating was 0.0005 cph/cm$^2$, the $\alpha$-ray emission amount was increased to 0.0022 cph/cm$^2$ after heating at 100° C., to 0.0023 cph/cm$^2$ after heating at 200° C., and further to 0.0035 cph/cm$^2$ after 1 year.

In Comparative Example 6, since the addition time was set to 20 minutes even though the addition rate of the lead nitrate aqueous solution was as fast as 100 mg/sec, lead ($^{210}$Pb) as the radioisotope of the raw material tin was insufficiently reduced. In addition, although the α-ray emission amount of the metal tin before heating was less than 0.0005 cph/cm$^2$, the α-ray emission amount was increased to 0.0025 cph/cm$^2$ after heating at 100° C., to 0.0025 cph/cm$^2$ after heating at 200° C., and further to 0.0031 cph/cm$^2$ after 1 year.

In Comparative Example 7, since the lead nitrate aqueous solution in which the α-ray emission amount of Pb contained in the lead nitrate aqueous solution was 12 cph/cm$^2$ was used, lead ($^{210}$Pb) as the radioisotope of the raw material tin was insufficiently reduced. In addition, although the α-ray emission amount of the metal tin before heating was 0.0006 cph/cm$^2$, the α-ray emission amount was increased to 0.0023 cph/cm$^2$ after heating at 100° C., to 0.0025 cph/cm$^2$ after heating at 200° C., and further to 0.0056 cph/cm$^2$ after 1 year.

The α-ray emission amount of the metal tin produced under the conditions described in Example 1 of Patent Document 1 of Comparative Example 8 was 0.0006 cph/cm$^2$ before heating, but increased to 0.0022 cph/cm$^2$ after heating at 100° C., to 0.0026 cph/cm$^2$ after heating at 200° C., and further to 0.0052 cph/cm$^2$ after 1 year.

The α-ray emission amount of the metal tin produced under the conditions described in Example 1 of Patent Document 2 of Comparative Example 9 was 0.0009 cph/cm$^2$ before heating, but increased to 0.0027 cph/cm$^2$ after heating at 100° C., to 0.0029 cph/cm$^2$ after heating at 200° C., and further to 0.0082 cph/cm$^2$ after 1 year.

Contrary to this, in the metal tins obtained in Examples 1 to 16 satisfying the production conditions of the fifth aspect of the present invention, the α-ray emission amount of the metal tin before heating was less than 0.0005 cph/cm$^2$. In addition, the α-ray emission amount of the metal tin after heating at 100° C. was less than 0.0005 cph/cm$^2$, and the α-ray emission amount of the metal tin after heating at 200° C. was less than 0.0005 cph/cm$^2$. Furthermore, the α-ray emission amount of the metal tin after 1 year was less than 0.0005 cph/cm$^2$.

That is, in the metal tins obtained in Examples 1 to 16, the α-ray emission amount before heating was less than 0.002 cph/cm$^2$, the α-ray emission amount after heating at 100° C. was 0.002 cph/cm$^2$ or less, the α-ray emission amount after heating at 200° C. was 0.002 cph/cm$^2$ or less, and the α-ray emission amount of the metal tin after 1 year was less than 0.002 cph/cm$^2$.

INDUSTRIAL APPLICABILITY

The stannous oxide having a low α-ray emission amount of the present invention can be used for replenishing tin or a tin alloy plating liquid with a Sn component for forming a solder bump for joining a semiconductor chip of a semiconductor device in which a soft error is a problem due to the influence of α-rays.

REFERENCE SIGNS LIST

11 Tin sulfate preparation tank
12, 22 Stirrer
13 Tin sulfate aqueous solution
14, 24 Pump
16, 26 Filter
17, 28 Transfer pipeline
21 First tank
23 Tin sulfate aqueous solution
27 Circulation pipeline

What is claimed is:

1. A method of producing stannous oxide having a low a-ray emission amount, the method comprising:
  a step (a) of dissolving tin containing lead as an impurity in a sulfuric acid aqueous solution, to prepare a tin sulfate aqueous solution and performing a first precipitation of lead sulfate in the tin sulfate aqueous solution;
  a step (b) of filtering the tin sulfate aqueous solution containing the lead sulfate obtained from the step (a) to remove the lead sulfate from the tin sulfate aqueous solution;
  a step (c) of performing a second precipitation of lead sulfate in the tin sulfate aqueous solution by adding a lead nitrate aqueous solution containing lead having an x-ray emission amount of 10 cph/cm$^2$ or less to a first tank for over 30 minutes while stirring the tin sulfate aqueous solution, from which lead sulfate has already been removed, obtained from the step (b) at a rotation speed of at least 100 rpm to cause lead sulfate to be precipitated in the tin sulfate aqueous solution, simultaneously circulating the tin sulfate aqueous solution so that a circulation flow rate is at least 1 vol %/min with respect to a total liquid amount in the first tank while filtering the tin sulfate aqueous solution to remove lead sulfate which has been precipitated from the tin sulfate aqueous solution a second time; and
  a step (d) of adding a neutralizing agent to the tin sulfate aqueous solution obtained from the step (c) to collect stannous oxide.

2. The method of producing stannous oxide having a low α-ray emission amount according to claim 1,
  wherein a concentration of lead nitrate in the lead nitrate aqueous solution in the step (c) is 10 mass % to 30 mass %.

3. The method of producing stannous oxide having a low α-ray emission amount according to claim 2,
  wherein an addition rate of the lead nitrate aqueous solution in the step (c) is 1 mg/sec to 100 mg/sec per 1 L of the tin sulfate aqueous solution.

4. The method of producing stannous oxide having a low α-ray emission amount according to claim 1,
  wherein an addition rate of the lead nitrate aqueous solution in the step (c) is 1 mg/sec to 100 mg/sec per 1 L of the tin sulfate aqueous solution.

* * * * *